United States Patent
McDonald et al.

(10) Patent No.: US 11,395,452 B2
(45) Date of Patent: Jul. 26, 2022

(54) METHOD OF MITIGATING COMPACTION AND A COMPACTION MITIGATION SYSTEM

(71) Applicant: DEERE & COMPANY, Moline, IL (US)

(72) Inventors: Brandon M. McDonald, Johnston, IA (US); Jacob D. Mayer, Des Moines, IA (US); Thomas G. Mueller, Waukee, IA (US); Benjamin M. Smith, Falls Church, VA (US); Ryan Jensen, Bondurant, IA (US)

(73) Assignee: DEERE & COMPANY, Moline, IL (US)

(*) Notice: Subject to any disclaimer, the term of this patent is extended or adjusted under 35 U.S.C. 154(b) by 203 days.

(21) Appl. No.: 16/023,699

(22) Filed: Jun. 29, 2018

(65) Prior Publication Data

US 2020/0000006 A1    Jan. 2, 2020

(51) Int. Cl.
| | | |
|---|---|---|
| *A01B 79/00* | (2006.01) | |
| *A01B 33/08* | (2006.01) | |
| *A01B 69/04* | (2006.01) | |
| *A01C 7/20* | (2006.01) | |
| *A01C 14/00* | (2006.01) | |

(52) U.S. Cl.
CPC .......... *A01B 79/005* (2013.01); *A01B 33/087* (2013.01); *A01B 69/008* (2013.01); *A01C 7/203* (2013.01); *A01C 14/00* (2013.01)

(58) Field of Classification Search
CPC ... A01B 79/005; A01B 33/087; A01B 69/008; A01B 37/00; A01B 79/00–79/02; A01C 7/203; A01C 14/00; E02F 3/00–3/968; E02F 5/00–5/326; E02F 9/00–9/2891

USPC .......................................................... 701/50
See application file for complete search history.

(56) References Cited

U.S. PATENT DOCUMENTS

| | | | |
|---|---|---|---|
| 6,041,582 A | 3/2000 | Tiede et al. | |
| 6,070,673 A | 6/2000 | Wendte | |
| 8,862,339 B2 * | 10/2014 | Henry ................. | A01B 79/005 701/50 |

(Continued)

FOREIGN PATENT DOCUMENTS

| | | |
|---|---|---|
| BR | PI0605229 A | 7/2008 |
| EP | 2267566 A2 | 12/2010 |

(Continued)

OTHER PUBLICATIONS

"Radishes: A new Cover Crop Option" Crops and Soils, Retrieved from internet on Sep. 20, 2016 4:40, http://www.nrcs.usda.gov/Internet/FSE_DOCUMENTS/nrcs142p2_022940.pdf on , dated Nov.-Dec. 2009, pp. 14-17.

(Continued)

*Primary Examiner* — Fadey S. Jabr
*Assistant Examiner* — Mohamed Abdo Algehaim

(57) ABSTRACT

In accordance with an example embodiment, a compaction mitigation system for a work area and a method of mitigating compaction in a work area are provided. The method includes determining a compaction map of the work area having compaction data associated with a plurality of reference points, passing a work tool through the work area at the plurality of reference points, and adjusting the work tool at the plurality of reference points based on the compaction data.

15 Claims, 6 Drawing Sheets

(56) References Cited

U.S. PATENT DOCUMENTS

| | | | |
|---|---|---|---|
| 9,026,321 B2 | 5/2015 | Henry et al. | |
| 9,066,465 B2 * | 6/2015 | Hendrickson | A01B 76/00 |
| 9,282,688 B2 * | 3/2016 | Casper | A01B 79/005 |
| 9,511,633 B2 | 12/2016 | Anderson et al. | |
| 9,516,801 B2 | 12/2016 | Kovach et al. | |
| 9,615,501 B2 * | 4/2017 | Pickett | A01D 41/141 |
| 9,733,355 B2 * | 8/2017 | Chan | G01S 13/89 |
| 10,255,670 B1 * | 4/2019 | Wu | H04N 7/183 |
| 10,918,008 B2 * | 2/2021 | Shearer | A01B 79/005 |
| 11,064,645 B2 * | 7/2021 | Shearer | B60K 23/00 |
| 11,212,962 B2 * | 1/2022 | Hendrickson | A01D 45/021 |
| 2003/0066357 A1 | 4/2003 | Upadhyaya et al. | |
| 2006/0200334 A1 | 9/2006 | Faivre et al. | |
| 2007/0021948 A1 | 1/2007 | Anderson | |
| 2008/0140431 A1 | 6/2008 | Anderson et al. | |
| 2009/0259483 A1 | 10/2009 | Hendrickson et al. | |
| 2012/0266795 A1 * | 10/2012 | Silbernagel | A01C 7/20 |
| | | | 111/149 |
| 2012/0323452 A1 * | 12/2012 | Green | A01B 79/005 |
| | | | 701/50 |
| 2013/0000535 A1 * | 1/2013 | Martin | A01C 7/006 |
| | | | 111/149 |
| 2013/0046419 A1 * | 2/2013 | Anderson | A01B 69/007 |
| | | | 701/2 |
| 2013/0180742 A1 * | 7/2013 | Wendte | A01C 7/006 |
| | | | 111/149 |
| 2014/0236431 A1 * | 8/2014 | Hendrickson | A01B 69/007 |
| | | | 701/50 |
| 2015/0237795 A1 * | 8/2015 | Koch | G09B 29/007 |
| | | | 701/50 |
| 2015/0373902 A1 | 12/2015 | Pasquier | |
| 2015/0378362 A1 | 12/2015 | Hulin | |
| 2016/0029547 A1 * | 2/2016 | Casper | A01B 63/002 |
| | | | 701/50 |
| 2016/0308954 A1 | 10/2016 | Wilbur et al. | |
| 2017/0112043 A1 * | 4/2017 | Nair | A01B 33/16 |
| 2018/0128933 A1 | 5/2018 | Koch et al. | |
| 2018/0206393 A1 * | 7/2018 | Stoller | A01B 76/00 |
| 2018/0220577 A1 * | 8/2018 | Posselius | A01B 63/1112 |
| 2019/0059209 A1 * | 2/2019 | Brune | A01C 7/203 |
| 2019/0090432 A1 * | 3/2019 | Duquette | G06Q 10/04 |
| 2019/0120296 A1 * | 4/2019 | Christie | F16D 1/076 |
| 2019/0269063 A1 * | 9/2019 | Martin | A01C 5/064 |

FOREIGN PATENT DOCUMENTS

| | | |
|---|---|---|
| EP | 2804459 A2 | 11/2014 |
| EP | 2668469 B1 | 4/2017 |
| WO | 2003023396 A2 | 3/2003 |
| WO | 2011063814 A1 | 6/2011 |
| WO | 2014130330 A1 | 8/2014 |
| WO | 2016182906 A1 | 11/2016 |
| WO | 2017049186 A1 | 3/2017 |

OTHER PUBLICATIONS

"Tillage Radish—Not Just for Tillage" University of Arkansas Research and Extension Accessed Sep. 20, 2016, retrieved from internet http://www.arkansas-crops.com/2015/08/25/require-planning-success/, Published on Aug. 25, 2015 (Part 1).

"Tillage Radish—Not Just for Tillage" University of Arkansas Research and Extension Accessed Sep. 20,2016, retrieved from internet http://www.arkansas-crops.com/2015/09/09/tillage-radish-series/, Published on Sep. 9, 2015 (Part 2).

Raper, R.L. 2001. Site-specific management of soil compaction. Proceedings of the Fourth Annual Conservation Tillage Cotton and Rice Conference, Houston, TX, Jan. 30-31, 2001. pp. 57-58.

European Search Report issued in counterpart European Patent Application No. 19182149.5 dated Dec. 2, 2019 (8 pages).

* cited by examiner

United States Patent document US 11,395,452 B2

METHOD OF MITIGATING COMPACTION AND A COMPACTION MITIGATION SYSTEM

BACKGROUND

In many agricultural operations, a tractor may tow a planter implement to plant crop seeds in a work area while applying a predetermined or variable downforce across points in the work area. After the planting operation, a tractor or other work vehicle, with or without an implement or other work tool, may handle several application passes, such as pre-emergent and/or post-emergent nutrient application and/or herbicide application passes to name non-limiting examples, through the same work area. Finally, a harvester or other work vehicle passes through the same work area to harvest the crop.

The passes through the work area accumulate to compact or increase the density of the soil in the work area. Such compaction may prevent timely germination of crop seeds, inhibit root growth, and/or prevent water or nutrients from reaching the crop roots. Accordingly, an operator utilizes one or more operations, such as a tillage operation to name a non-limiting example, to mitigate or reduce soil compaction in the work area. The operator may generally pass the tillage equipment or other compaction-mitigating work tool at a constant depth or setting through all areas of the work area. However, particularly compacted areas, especially those areas at or near paths travelled repeatedly by a grain cart or other work vehicle, may not be sufficiently decompacted, or ripped deep enough in the case of a tillage operation. Further, the work tool may waste time and energy passing through areas of little or no compaction.

Therefore, there exists a need in the art for a method of mitigating compaction and a compaction mitigation system that effectively mitigate soil compaction in the most compacted areas of the work area without wasting time or energy on mitigation in areas of lesser compaction.

SUMMARY

Various aspects of examples of the present disclosure are set out in the claims.

According to a first aspect of the present disclosure, a method of mitigating compaction in a work area is provided. The method provides determining a compaction map of the work area having compaction data associated with a plurality of reference points, passing a work tool through the work area at the plurality of reference points, and adjusting the work tool at the plurality of reference points based on the compaction data.

According to a second aspect of the present disclosure, a method of mitigating compaction with a vehicle in a work area is provided. The method includes determining at least one data layer associated with a plurality of reference points in the work area, geo-referencing the at least one data layer, determining vehicle position data as the vehicle passes through the work area at the plurality of reference points, and adjusting the work tool at the plurality of reference points based on the vehicle position data and the at least one data layer.

According to a third aspect of the present disclosure, a compaction mitigation system for a work area is provided. The system includes a compaction map of the work area having compaction data associated with a plurality of reference points, a vehicle configured to pass through the work area at the plurality of reference points, a location-determining receiver configured to receive location data in the work area, and a work tool coupled to the vehicle and configured to be controlled at the plurality of reference points based on the location data and the compaction data.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 6 of the drawings.

Figure 1:
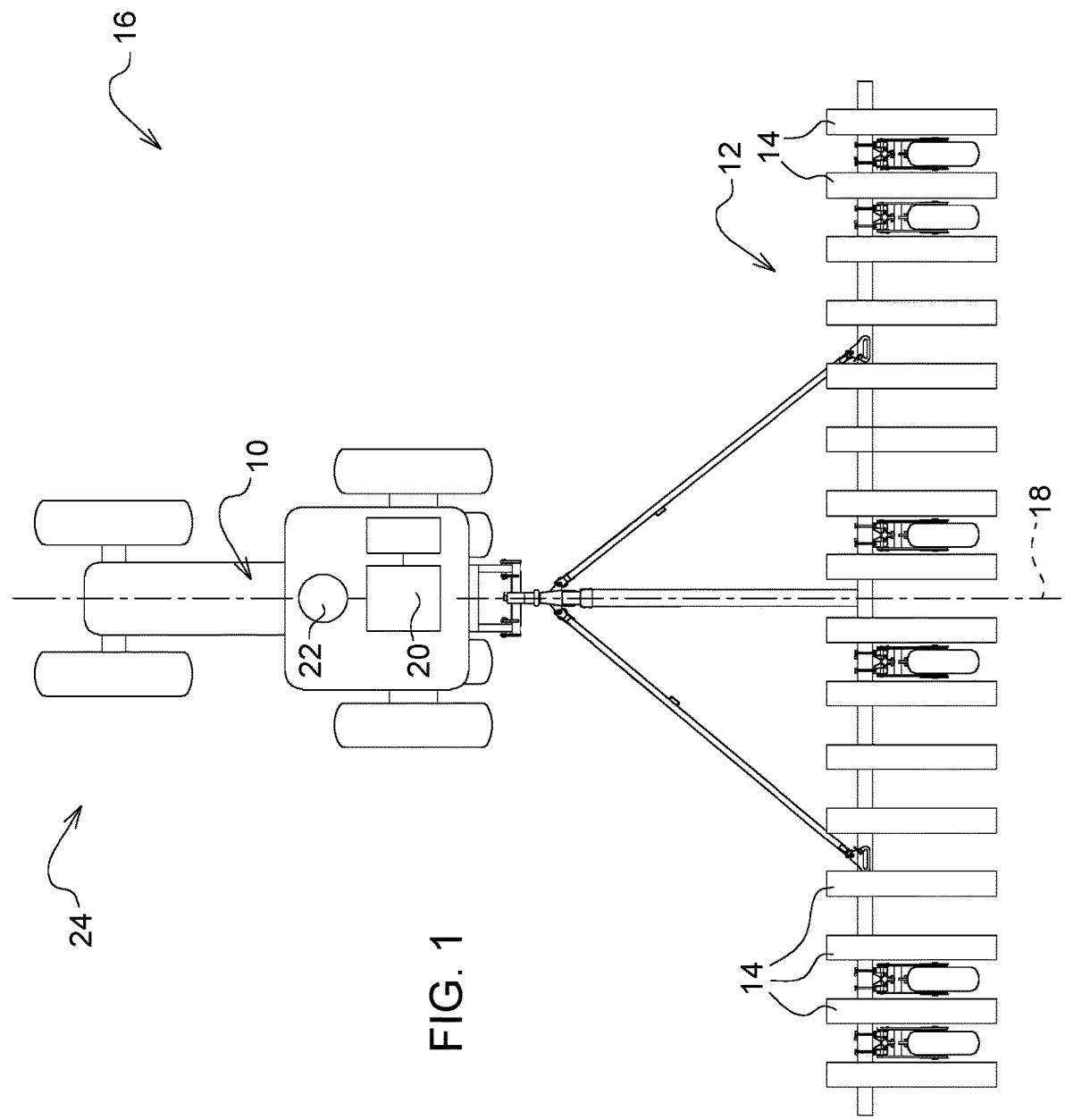
FIG. 1 is a top plan view of a compaction mitigation system for a work area in accordance with an embodiment of the present disclosure.

Referring now to FIG. 1, a work vehicle 10 is illustrated in accordance with one or more embodiments of the present disclosure. The work vehicle 10 of FIG. 1 includes a tractor in the illustrated embodiment, but may include any other work vehicle in one or more further embodiments. The work vehicle 10 of the embodiment illustrated in FIG. 1 coupled to or otherwise physically connected with a work tool 12. The work tool 12 includes a planting or seeding implement having one or more individual row units 14 in the illustrated embodiment, but may include a cultivator or other tillage equipment and/or another work tool in further embodiments. Further, the work tool 12 may be integral with the vehicle 10 in an embodiment, and any reference to the vehicle 10 in the present disclosure includes a reference to the work tool 12, and vice versa.

The vehicle 10 and/or work tool 12 is configured to pass through a work area 16 along one or more planned or unplanned path(s) 18. In an embodiment, the vehicle 10 includes a predetermined path plan stored on a vehicle controller 20 that the vehicle 10 and/or an operator of the vehicle may reference while making passes through the work area 16. The vehicle 10 and/or the work tool 12 may further include a location-determining receiver 22, such as a global navigation satellite system (GNSS) receiver in a non-limiting example. During one, some, or all of the passes through the work area 16, the controller 20 and/or the operator, the vehicle 10, and/or the work tool 12 may utilize or reference the receiver 22 in order to assist guidance or path navigation of the work vehicle 10 and/or the work tool 12. As will be explained in further detail below, the work vehicle 10 and work tool 12 form part of a compaction mitigation system 24 for the work area 16.

Figure 2:
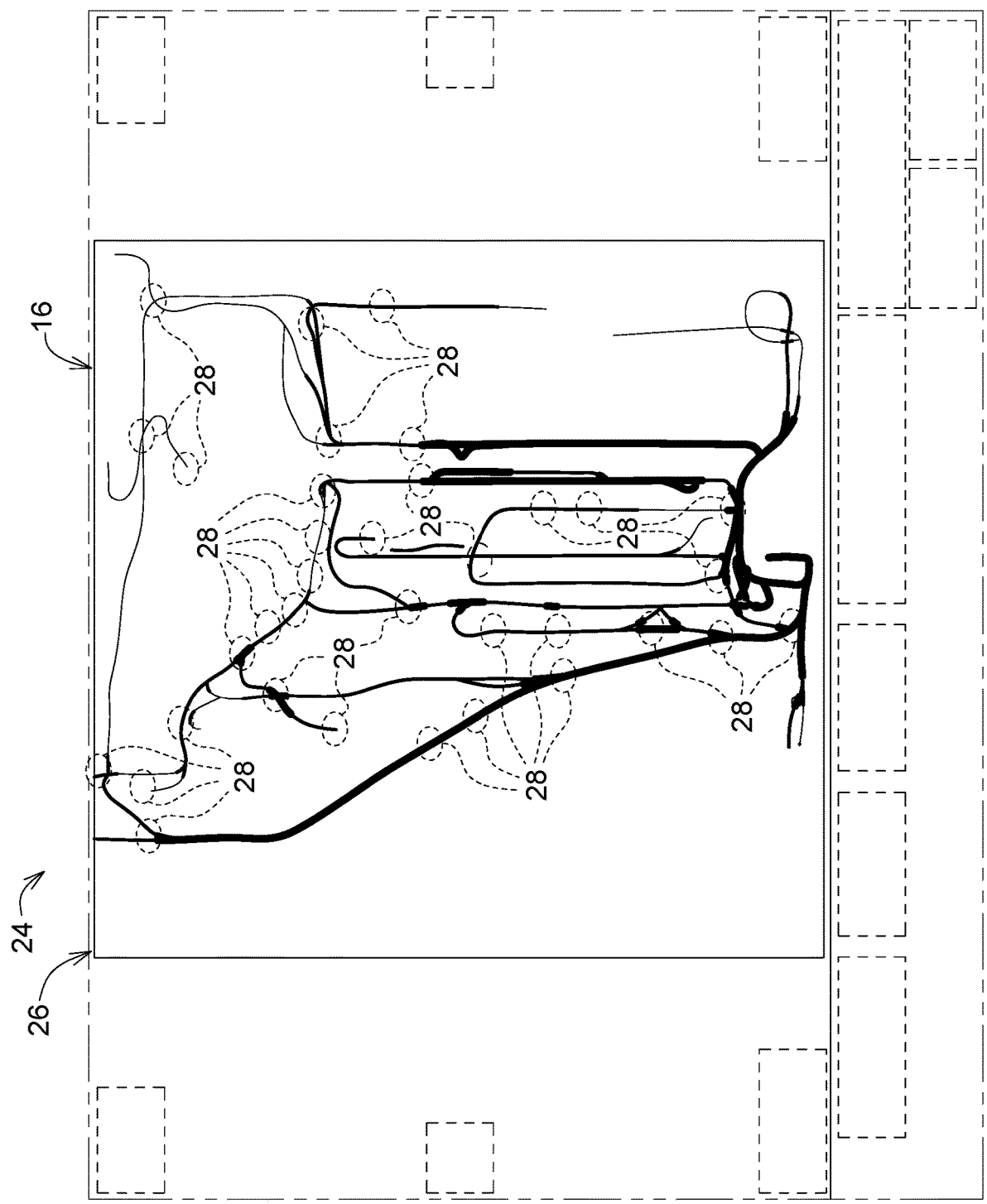
FIG. 2 is a graphical user interface view of a compaction map for a work area in accordance with an embodiment of the present disclosure.

As illustrated in FIG. 2, the system 24 includes a compaction map 26 of the work area 16 having compaction data associated with a plurality of reference points 28 in the work area 16. The compaction data in one or more embodiments includes information with any degree of specificity from a binary compact or non-compact distinction at one or more particular reference points 28 to determining a specific level of compaction among an infinitely variable level of compaction between a non-compact, loose soil to an extremely dense or compacted soil at the one or more particular reference points 28. The compaction map 26 is stored with the vehicle 10 in the controller 20 in the illustrated embodiment, but may be stored in or otherwise accessible from portable storage media, a local or extended area network, a cloud-based storage system, and/or available via wired or wireless transmission to the controller 20. Further, the compaction map 26, as described herein, need not include a visual representation of the work area 16, but may include a listing or collection of the compaction data associated with the plurality of reference points 28. The reference points 28 are specific geographic locations in the illustrated embodiment, but may include general area markers or other precise or general geographic reference points in additional embodiments. For illustration purposes, a representative sampling of the reference points 28 is identified in FIG. 2. The reference points 28, including those not illustrated in FIG. 2, represent a discrete location or specific area of the work area 16 and may be of any quantity having any spacing distance and/or location in the work area 16. The vehicle 10 is configured to pass through the work area 16 at or along the reference points 28 in the illustrated embodiment such that the receiver 22 determines the location of the vehicle 10 and/or the work tool 12, including a location relative to the reference points 28.

In accordance with an embodiment of the present disclosure, the system 24 controls or adjusts the work tool 12 at the reference points 28 based on the location data determined by the receiver 22 and the compaction data of the compaction map 26. In an embodiment of the system 24, the work tool 12 is a cultivator or tillage implement, and the system 24 controls or adjusts an operating depth, such as a ripping depth, of the tillage implement based on the location of the vehicle 10 and/or the tillage implement and the compaction data. In an embodiment, the system 24 increases an operating depth of the tillage equipment if the controller 20 or other component of the system 24 determines that the vehicle 10 and/or the tillage implement is at, near, or approaching one or more reference point(s) 28 associated with compaction data indicating a relatively compact soil condition. Similarly, in an embodiment, the system 24 decreases an operating depth of the tillage equipment if the controller 20 or other component of the system 24 determines that the vehicle 10 and/or the tillage implement is at, near, or approaching one or more reference point(s) 28 associated with compaction data that indicates a relatively loose or non-compact soil condition.

In a further embodiment, the system 24 maintains a minimum operating depth of the tillage equipment such that the implement is at its most shallow depth across the work area 16 unless and until the vehicle 10 and/or the work tool 12 is at, near, or approaching a relatively compact soil area as indicated by the compaction data. In one non-limiting example, the compact soil area includes one or more paths traveled by a tractor, harvester, grain cart, and/or other vehicle or work tool resulting in the stored or otherwise determined high soil compaction data. At the relatively compact soil area, the controller 20 or other component of the system 24 increases the depth of the work tool 12 to effectively break up, loosen, or otherwise mitigate compaction at the relatively compact soil area. Once the vehicle 10 and/or the work tool 12 is no longer at or near the relatively high compaction area, the controller 20 and/or another component of the system 24 adjusts the depth of the work tool 12 back to the minimum operating depth. The system 24 adjusts the depth of the tillage implement across the entire implement or at individual row units or sections of the tillage implement to provide precise compaction mitigation based on the compaction data.

In another embodiment of the system 24, the work tool 12 is a planter or seeding implement, and the system 24 controls or adjusts actuation of the seeding, such as initiating and terminating the placement of seeds at a particular location, based on the location of the vehicle 10 and/or the planter/seeding implement and the compaction data. Certain cover crops, including radish to name a non-limiting example, mitigate soil compaction because their root system extends into the compact soil to break up, loosen, or otherwise decompact the soil. The planter or seeding device in an embodiment of the system 24 is configured to selectively plant a compaction-mitigating cover crop based on the compaction data indicating a relatively compact soil condition. Controlling or adjusting actuation of seeding, as described herein, further includes controlling or adjusting the rate, population, or amount of seeds planted in particular embodiments. The system 24 of particular embodiments changes a rate, population, or amount of seeding in a particular area based on the compaction. In non-limiting examples, in a more compacted area, corn seeds would be planted at a lower rate or population relative to increased planting in areas of lower compaction. In contrast, the system 24 would plant soybeans and cotton at a higher rate, population, or amount in areas of higher compaction while planting at a lower rate or population in areas of lower compaction.

Figure 3:
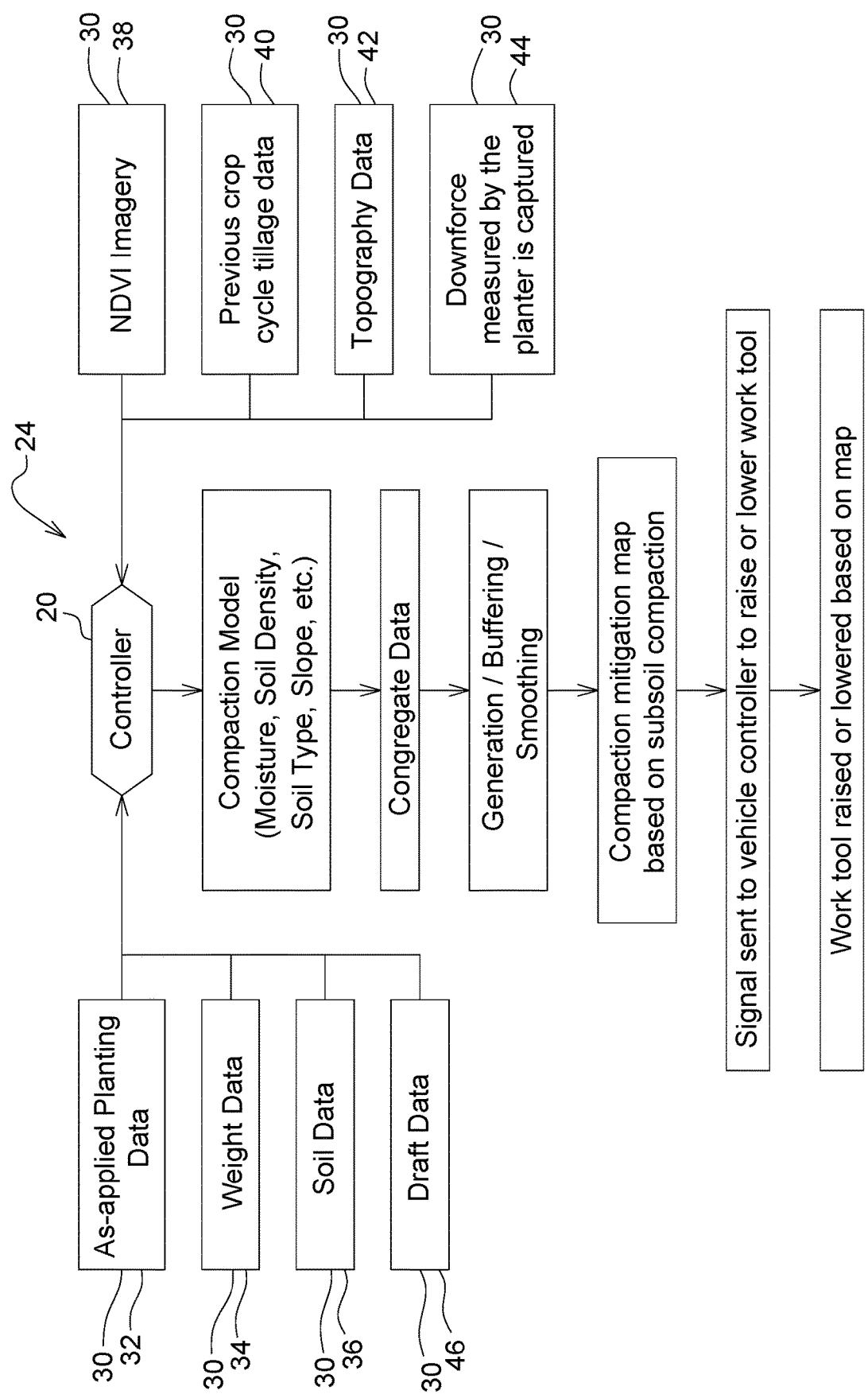
FIG. 3 is a flow diagram showing operations for a compaction mitigation system for a work area in accordance with an embodiment of the present disclosure.

As illustrated in FIG. 3, the controller 20 receives one or more data inputs or layer(s) 30. One, some, or all of the layers 30 are georeferenced to associate the data of each to a location, such as the one or more reference points 28, determined by a location-determining receiver similar to the receiver 22 discussed above.

Figure 4:
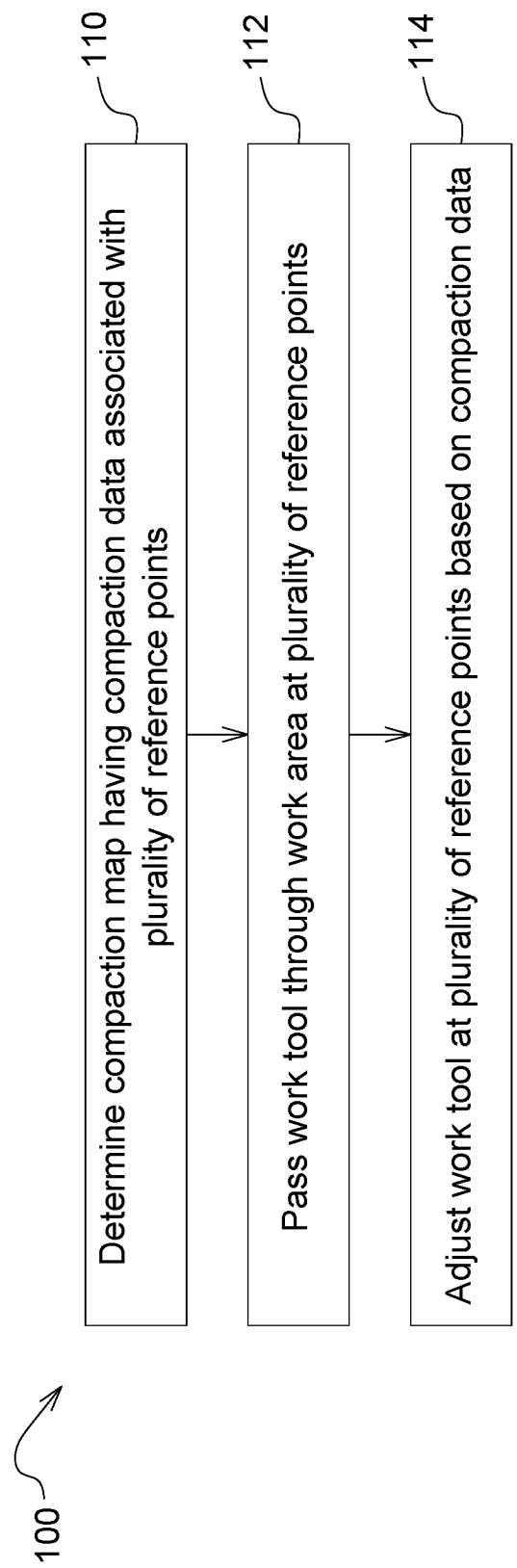
FIG. 4 illustrated a method of mitigating compaction in a work area in accordance with an embodiment of the present disclosure.

Accordingly, FIG. 4 illustrates a method 100 of mitigating compaction that includes determining, at step 110, the compaction map 26 of the work area 16 having compaction data associated with the reference points 28 and passing, at step 112, the work tool 12 through the work area 16 at the reference points 28. The method 100 of an embodiment includes determining the one or more data layer(s) 30 associated with one or more reference point(s) 28 in the work area 16. The method 100 further includes adjusting, at step 114, the work tool 12 at the reference points 28 based on the compaction data. The method 100 may further include passing one or more vehicle(s) and/or work tool(s) (not shown), including, without limitation, a combine, tractor, grain cart, implement, and/or any other work vehicle or other vehicle, through the work area 16 at the one or more reference point(s) 28 to generate the associated compaction data.

In a non-limiting example, a tractor pulling a seeding implement, a tractor pulling a sprayer or other nutrient application implement, and/or a harvester may pass through the work area 16 one or more times per season. During each pass, the location of the vehicle and/or implement may be known via GNSS systems and such location data (and additional soil data and/or weight, fill, and/or fuel data) may be stored and utilized in one or more embodiments of the system 24 or method 100 described herein.

The data layer(s) 30 include, in the embodiment illustrated in FIG. 3, as-applied planting data 32 indicating compaction mapping data and/or other planting, tillage, or other operational data from a previous operation, vehicle and/or work tool weight data 34, soil data 36, draft data 46, normalized differential vegetation index (NDVI) imagery 38 or other crop or vegetation imagery, previous crop cycle tillage data 40, topographical data 42, and planter or other implement downforce 44.

The vehicle and/or work tool weight data 34 includes, without limitation, weight data of a tractor with sprayer, side-dress, planter, etc. implement or grain cart that is estimated, approximated, or otherwise determined based on the fill level in the tank or storage area or cart scale and/or fuel level in the tractor, geo-referenced to particular paths, locations, or other reference points 28 of the work area 16, or weight data of a harvester that is estimated, approximated, or otherwise determined based on the tank fill level and/or fuel level, also geo-references to particular paths, locations, or other reference points 28 of the work area 16. Accordingly, the method of an embodiment of the present disclosure further includes determining one or more of a volume data and a weight data of a material of one or more vehicle(s) passing through the work area 16 at the reference point(s) 28. The material includes one or more of a fuel, a grain, a crop, a waste material, a liquid application material, and a solid application material to name non-limiting examples.

Figure 5:
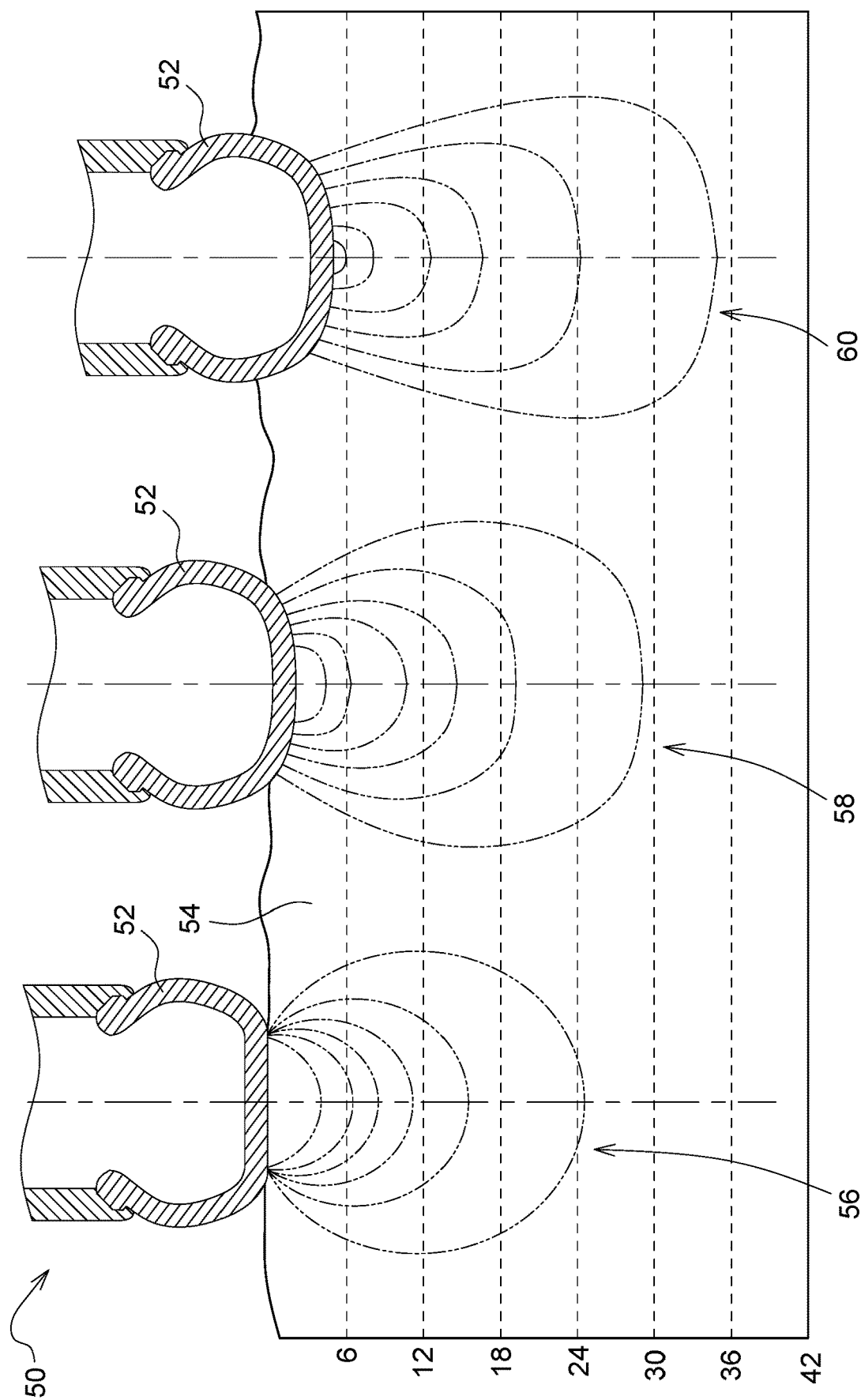
FIG. 5 is a chart illustrating soil compaction based on soil data for a compaction mitigation system in accordance with an embodiment of the present disclosure.

Determining the compaction map 26 of one or more embodiments herein includes determining the soil data 36, including determining soil density, soil moisture, soil compaction depth, soil type and/or content, and/or a soil freeze state or a determination of whether the soil is frozen at one or more reference point(s) 28. FIG. 5 includes a chart 50 illustrating varying effects of soil moisture and density on soil compaction and the depth of soil compaction when the wheel 52 of a vehicle or other wheeled object passes over the soil 54. A first area 56 of the soil 54 is a hard and dry soil, a second area 58 of the soil 54 includes water content, but has only moderate density, and a third area 60 of the soil 54 is a wet, relatively loose soil. Pressure lines 62 in the chart 50 indicate pressure gradients with maximum pressure at each area being located closest to the wheel 52. As shown in FIG. 5, the first area 56 experiences a high compaction immediately under the wheel 52, but the compaction remains relatively shallow. The moisture content of the second area 58 results in compaction that is deeper than the first area 56. The wet condition of the third area 60 results in the deepest soil compaction. In one or more embodiments of the present disclosure, the method 100 determines the compaction map 26 based at least partially on by combining soil data, such as the soil data described above, with vehicle and/or work tool weight data associated with the reference points of the soil data to create, form, or otherwise determine the compaction map 26. One will appreciate that any one or more other or additional data layers 30 may be utilized in creating, forming, or otherwise determining the compaction map 26.

Soil moisture, soil density, soil compaction depth, soil type and/or content, and/or a soil freeze state is determined, in particular embodiments, through one or more soil moisture or other sensors or testing equipment, published or otherwise accessible weather or soil reports or information, manual input by an operator or another, or any other method to provide general or specific soil information in lieu of or in addition to any other method described herein. Further, soil density and/or other soil data may be determined using vehicle and/or implement draft data or downforce data from a planter or other implement. In a non-limiting example, the tractor or implement may have one or more sensors capable of determining draft as it operates in the work area 16. The draft data may be georeferenced or otherwise associated with one or more reference points 28 in the work area 16, referenced as a data layer 30 to determine the compaction map 26, and/or stored for use with or by the system 24. Similarly, a planter or other implement may include a hydraulic or mechanical device for applying downforce to the implement to allow proper operation into the soil. The downforce may be monitored or otherwise determined, such as based on hydraulic pressure at a hydraulic line of the downforce-applying mechanism, georeferenced or otherwise associated with one or more reference points 28 in the work area 16, referenced as a data layer 30 to determine the compaction map 26, and/or stored for use with or by the system 24.

The draft data or downforce data may be determined for the work tool 12 or for individual portions or sections of the work tool 12. In a non-limiting example, the system 24 may determine georeferenced individual row unit downforce data at each row unit of a multiple-row unit planter implement to determine the compaction map 26. Alternatively, the system 24 may determine georeferenced row unit downforce data based on the entire planter implement to determine the compaction map 26. Determining downforce data or other data at the individual row units results in a higher resolution compaction map 26 to improve the precision of the compaction mitigation operation.

Referring again to FIG. 3, the controller 20, another component of the system 24, and/or another off-board component or system receives the data layer(s) 30 and congregates, combines, or accumulates the data. The controller 20 or system 24 of the illustrated embodiment further creates or otherwise processes one or more compaction model(s) using compaction and other data from the data layer(s) 30 before combining or processing the data further. The controller 20 then generates a compaction mitigation prescription map, operation, or path plan, and buffers and/or smoothes the map, operation, or path plan, as illustrated in FIG. 3.

In an additional, non-limiting embodiment, the data layer(s) 30 are congregated, combined, and/or accumulated outside of or off-board a work vehicle or remote from the work area 16 in the system 24. The controller 20 may be at least partially located off-board a work vehicle in the work area 16 or outside of the work area 16, or another controller may be used in addition to or in place of controller 20 for the embodiment of FIG. 3. Further, the creation of a compaction model, the congregation, generating, and/or buffering of data, and/or the formation of the compaction mitigation map based on subsoil compaction may occur either on-board a work vehicle in the work area 16 via the controller 20 or another on-board component, off-board or remote from a work vehicle or the work area 16, or both. In such an embodiment, the data processing or map or model creation may be performed by a more powerful processor before the map, model, or data is returned to the work area 16 or vehicle for further processing, display, or execution with a vehicle, work tool, or implement controller. Sending the map, model, or data to the vehicle in the work area 16 may be accomplished via portable data storage device and/or wireless communication to name non-limiting examples.

In the embodiment illustrated in FIG. 3, once the compaction mitigation map 26 is created, the controller 20 or other component of the system 24 receives a signal relating to or otherwise responds to the map 26 and raises or lowers the shanks and/or discs of the tillage work tool 12 or otherwise actuating the work tool 12 based on the map 26, as illustrated in FIG. 3. The compaction mitigation operation, map, or path plan may be stored internally or external to the controller 20, such as in a cloud-based data platform in a non-limiting example. A compaction mitigation operation, map, or path plan may be downloaded, accessed, or otherwise made available to the controller 20 and/or a user or operator of the vehicle 10 or work tool 12 and executed, as described in further detail below.

Figure 6:
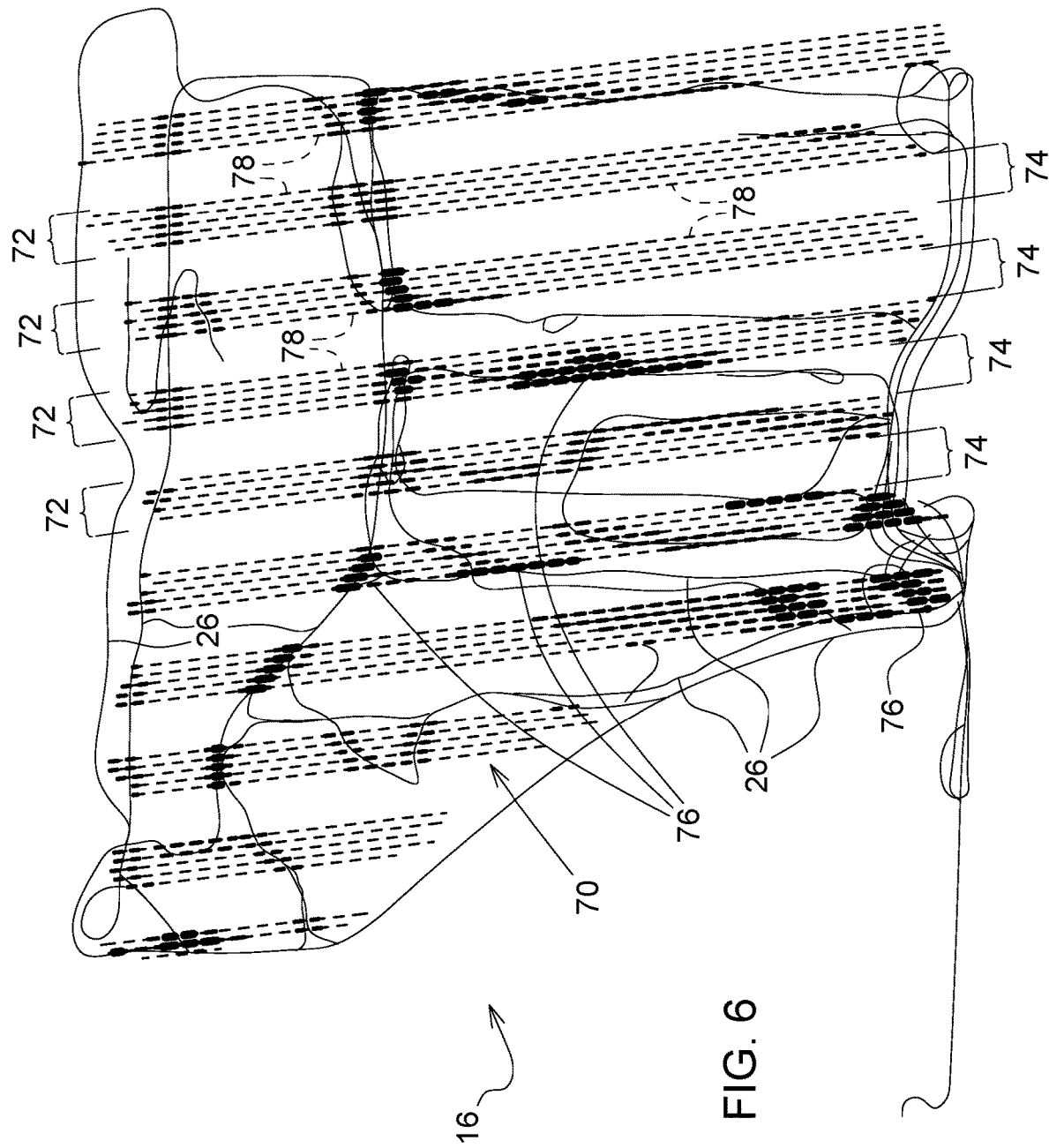
FIG. 6 illustrates a work area for a compaction mitigation system in accordance with an embodiment of the present disclosure.

Referring now to FIG. 6 with continuing reference to FIG. 3, a compaction mitigation operation 70 overlaying the compaction map 26 of one non-limiting example of an embodiment of the present disclosure is illustrated. The compaction mitigation operation of FIG. 5 includes various tillage depths to control a tillage implement based on the compaction data of the compaction map 26 for the work area 16. For illustration purposes, the compaction mitigation operation 70 covers strips 72 of five rows, skipping control strips 74 that are tilled at a constant depth. The control strips 74 partially cover the work area 16 in a conventional manner in accordance with a control operation. In a non-limiting example, the control strips 74 are tilled at a 12-inch depth, while the variable strips 72 are tilled at depths of between 9 inches and 12 inches depending on the compaction data of the compaction map 26. Relatively deep tillage areas 76 are located at or near reference points 28 associated with higher compaction in the compaction map 26, while relatively shallow tillage areas 78 are located at or near referenced points 28 associated with lower or no compaction in the compaction map 26. Viewing FIG. 6, one can recognize that the system 24 of the embodiments described herein adjusts the operation of the work tool 12, such as by varying a tillage depth at the reference points 28 of the work area 12, based on the compaction data of the compaction map 26.

Because the work tool 12 is not required to operate as deeply into the soil in the many relatively shallow tillage areas 78, the tractor or other vehicle 10 requires less fuel or other energy source to pull or otherwise transport the work tool 12 through the work area 16. In contrast, a conventional tillage operation involving a deeper tillage operation across the entire work area 16 requires significantly more time and energy and results in increased wear on vehicle, engine, implement, and/or tool. In the strip trial for the operation 70 illustrated in FIG. 6, the following fuel consumption, speed, productivity, and engine power were observed.

|  | Control operation | Operation of FIG. 6 |
| --- | --- | --- |
| Average Fuel Consumption | 24.81 gallons/hour | 18.82 gallons/hour |
| Average Speed | 5.14 miles/hour | 6.41 miles/hour |
| Average Productivity | 11.21 acres/hour | 13.99 acres/hour |
| Average Engine Power | 89.09% | 66.61% |

As illustrated above, the compaction mitigation operation that adjusts the work tool 12 based on the compaction data of the compaction map 26 results in significantly reduced fuel energy savings, increased operation speed and productivity such that more work is completed in less time, and reduced engine power indicating an associated reduction in engine, vehicle, implement, and/or tool wear and reduced risk of equipment damage or breakage.

In an additional embodiment of the present disclosure, the controller 20 and/or another component of the system 24 adjusts or moves the work tool 12 deeper into the soil as the vehicle 10 and/or the work tool 12 approaches an area of relatively higher compaction. As such, the controller 20 and/or another component of the system 24 begins adjustment, lowering, and/or movement of the work tool 12 at a first reference point associated with relatively lower compaction data in response to relatively higher compaction data associated with a second reference point. The controller 20 and/or another component of the system 24 would further stop adjustment or movement of the work tool 12 upon or prior to the work tool 12 reaching the second reference point such that the work tool 12 would be positioned more deeply in the soil when the work tool 12 reaches the second reference point. In such a case, stalling or overloading of the engine or other powerplant of the vehicle 10 is prevented.

In a further embodiment of the present disclosure, the system 24 includes creating a path plan for compaction mitigation in the work area 16 such that the vehicle 10 and/or the work tool 12 traverses the work area 16 over compacted areas only, avoids traversing the work area 16 over non-compacted area, and/or follows a path of a soil compaction-causing vehicle through the work area 16. In the embodiment, any embodiment of soil compaction mitigation described herein may be utilized for creating such a path plan. In one embodiment, the tillage operation or other compaction mitigation operation would occur only or substantially only in the areas where the soil is compacted. In a non-limiting example, in a work area 16 where a soybean crop was removed, such fields do not typically receive tillage or other compaction mitigation across the entire field. The operator in such fields may limit or substantially limit mitigation, such as by tilling, to areas that were subjected to heavy vehicle traffic, such as those areas known by the operator from previous operations, determined by operator knowledge of the field, or observed by the operator, such as via vehicle tracks in the soil. The system 24, in accordance with one or more embodiments, utilizes the path plan with an associated compaction mitigation map or other data relating to mitigation values associated with locations in the work area 16 to allow a vehicle guidance system to operate with the controller of the work tool 12 for compaction mitigation. Such a path plan or other data may be provided to the vehicle 10 at the controller 20 and/or for in-cab display in particular embodiments.

Without in any way limiting the scope, interpretation, or application of the claims appearing below, a technical effect of one or more of the example embodiments disclosed herein is a reduction in energy during a compaction mitigation operation while effectively mitigating compaction of even the most compacted areas of the work area 16. Further, the embodiments disclosed herein reduce the time required to complete the compaction mitigation operation, thereby resulting in increased productivity. Even further, the embodiments disclosed herein reduce the wear on engine, vehicle, implement, and/or tool utilized for compaction mitigation and prevent or reduce the likelihood of damage or breakage of the engine, vehicle, implement, and/or tool involved in the compaction mitigation operation.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A method of mitigating compaction in a work area, the method comprising:
    passing a vehicle through the work area at a plurality of reference points to generate compaction data for a compaction map;
    determining vehicle weight data of the vehicle from passing the vehicle through the work area, the vehicle weight data being associated with the plurality of reference points;
    determining the compaction map of the work area having the compaction data to include the vehicle weight data associated with the plurality of reference points, wherein the compaction map comprises a first compaction level at a first reference point of the plurality of reference points and a second compaction level at a second reference point of the plurality of reference points that is greater than the first compaction level;
    passing a work tool through the work area at the plurality of reference points after determining the compaction map;
    passing the work tool through the first reference point before passing the work tool through the second reference point;
    adjusting the work tool at the plurality of reference points based on the compaction data of the compaction map;
    beginning adjustment of the work tool at the first reference point associated with the first compaction level; and
    stopping adjustment of the work tool before the work tool reaches the second reference point associated with the second compaction level that is greater than the first compaction level.

2. The method of claim 1, wherein determining the compaction map comprises determining soil data associated with the plurality of reference points.

3. The method of claim 2, wherein the soil data comprises at least one of a soil density, a soil moisture, a soil type, and a soil freeze state.

4. The method of claim 1, wherein determining the compaction map further comprises determining at least one of a volume data and a weight data of a material of at least one vehicle passing through the work area at the plurality of reference points.

5. The method of claim 4, wherein the material comprises at least one of a fuel, a grain, a crop, a waste material, a liquid application material, and a solid application material.

6. The method of claim 1, wherein determining the compaction map comprises combining soil data associated with the plurality of reference points with the vehicle weight data associated with the plurality of reference points.

7. The method of claim 1, wherein determining the compaction map comprises determining vehicle draft data associated with the plurality of reference points.

8. The method of claim 1, wherein determining the compaction map comprises determining row unit downforce data associated with the plurality of reference points.

9. The method of claim 1, wherein determining the compaction map comprises determining individual row unit downforce data at each of a plurality of row units associated with the plurality of reference points.

10. The method of claim 1, wherein determining the compaction map further comprises aggregating the compaction data associated with the plurality of reference points from a plurality of passes by at least one of the vehicle and a work tool passing through the work area.

11. A method of mitigating compaction with a vehicle having a work tool in a work area, the method comprising:
    passing through the work area at a plurality of reference points to form a compaction map associated with compaction in the work area;
    determining at least one data layer associated with the plurality of reference points forming the compaction map in the work area;
    geo-referencing the at least one data layer in the compaction map;
    creating a predetermined path plan for compaction mitigation in the work area that is stored to be available to a controller of the vehicle such that the controller is configured to control operation of the vehicle, wherein at least one of the vehicle and the work tool traverses the work area over compacted areas of the compaction map and avoids traversing the work area over non-compacted areas of the compaction map;
    passing the vehicle through the work area after forming the compaction map along the path plan;
    determining vehicle position data as the vehicle passes through the work area at the plurality of reference points along the path plan;
    wherein the compaction map comprises a first compaction level at a first reference point of the plurality of reference points and a second compaction level at a second reference point of the plurality of reference points that is greater than the first compaction level;
    passing the work tool through the work area at the plurality of reference points after determining the compaction map;
    passing the work tool through the first reference point before passing the work tool through the second reference point;
    adjusting the work tool at the plurality of reference points based on the vehicle position data and the at least one data layer;
    beginning adjustment of the work tool at the first reference point associated with the first compaction level; and
    stopping adjustment of the work tool before the work tool reaches the second reference point associated with the second compaction level that is greater than the first compaction level.

12. The method of claim 11, wherein the at least one data layer comprises a plurality of data layers.

13. The method of claim 11, further comprising combining the vehicle position data with the at least one data layer.

14. The method of claim 11, wherein the at least one data layer comprises at least one of planting location data, historical vehicle weight data, historical vehicle location data, soil data, vehicle draft data, vegetation imagery data, historical tillage data, topographical data, and planter downforce data.

15. A compaction mitigation system for a work area, the system comprising:
    a compaction map of the work area having compaction data associated with a plurality of reference points;
    wherein the compaction map comprises a first compaction level at a first reference point of the plurality of reference points and a second compaction level at a second reference point of the plurality of reference points that is greater than the first compaction level;
a vehicle configured to pass through the work area at the plurality of reference points after the compaction map is created;
a path plan for compaction mitigation in the work area and configured to be followed by the vehicle to traverse compacted areas of the work area in accordance with the compaction map;
a receiver configured to receive location data in the work area;
a controller accessing the path plan to control a path of the vehicle based on the path plan and configured to be referenced while the vehicle makes passes through the work area along the path plan and accessing the compaction map; and
a work tool coupled to the vehicle and configured to be controlled at the plurality of reference points by the controller accessing the compaction map based on the location data and the compaction data;
wherein the work tool is configured to be controlled to begin adjustment of the work tool at the first reference point associated with the first compaction level and stop adjustment of the work tool before the work tool reaches the second reference point associated with the second compaction level that is greater than the first compaction level.

* * * * *